United States Patent Office 2,820,806
Patented Jan. 21, 1958

2,820,806

ESTER INTERCHANGE CATALYSTS

John Harris Haslam, Landenberg, Pa., assignor to E. I. du Pont de Nemours and Company, Wilmington, Del., a corporation of Delaware No Drawing. Application October 26, 1956
Serial No. 618,451

9 Claims. (Cl. 260—448.8)

This invention relates to ester interchange reactions involving silicon esters, and more particularly it relates to a new and improved method for the catalysis of these reactions.

Ester interchange reactions broadly comprise the reaction of an ester with an alcohol or another ester to form a different ester than the reactant ester. Such reactions include those esterification reactions heretofore commonly referred to as alcoholysis, re-esterification, trans-esterification, ester interchange, and ester disproportionation reactions. This invention relates specifically to such reactions as applied to silicon esters. Such reactions are known, and an example of such a reaction is an ester interchange between a silicon ester and a carboxylic acid ester to yield two new esters. Another example is the reaction between an ester and an alcohol to form a new ester and to liberate an alcohol.

The "silicon esters" used in this invention are those compounds of silicon in which at least one of the valences is occupied by an alkoxy or aryloxy group. An orthoester of silicic acid would have four such alkoxy or aryloxy groups attached to the silicon, e. g., tetraethyl silicate. However, other silicon esters have some of the valences of the silicon occupied by hydrocarbon groups. An example of this type of compound is dimethyl diethoxy silane. Both types of esters discussed above are within the scope of this invention. It is known that such esters may be modified by the "so-called" trans-esterification reactions with which this invention is concerned. However, it has been well recognized that such reactions are inclined to be quite slow and to be difficult to carry to completion. Furthermore, it has been proposed to use certain catalysts to improve the efficiency of these reactions. For instance, one may call attention to a paper by D. F. Peppard, W. G. Brown and W. C. Johnson in J. Am. Chem. Soc. 68, 77 (1946) under the title "Trans-esterification Reactions of Alkyl Silicates." The authors have shown that certain reactive metal alkoxides, such as alkoxides of aluminum, magnesium and antimony, as well as aluminum chloride, improve the efficiency of such reactions. They also cite a number of trans-esterification reactions and include in a table the time and the percent of reaction for many of these. In many of these examples, the reactions have proceeded to considerably better than 90% of completion, but the times involved range from about two hours up to as much as fifteen hours to obtain satisfactory completion.

It is an object of this invention to provide a new and improved method for the catalysis of ester interchange reactions involving silicon esters whereby such reactions are speeded up at lower temperatures, objectionable side reactions are reduced, and pure products are obtained.

The object of this invention may be accomplished by conducting an ester interchange reaction between a silicon ester and an organic compound selected from the group consisting of alcohols and esters of carboxylic acids in the presence of a catalytic amount of an organic titanium ester.

In a preferred embodiment this invention comprises conducting an ester interchange reaction between a silicon ester and an organic compound selected from the group consisting of alcohols, phenols and esters of carboxylic acids in the presence of a catalytic amount of an alkyl orthotitanate, heating to effect an ester interchange and distilling off the more volatile end-product.

The following examples will illustrate this invention in detail, but they are not to be construed as being in limitation thereof. Unless otherwise specified, all parts are parts by weight.

*Example I*

100 grams of tetraethyl silicate (tetraethoxy silane) and 200 grams of n-butanol were placed in a boiling flask under a distilling column. On heating to full reflux, the head temperature remained at 116° C. for 20 minutes indicating the simple refluxing of the butanol. 5 ml. of tetra-isopropyl titanate was then added to the flask. Almost immediately, the head temperature dropped to 77° C. and ethanol was taken off at a maximum rate of 72 milliliters per minute until the head temperature again rose to 116° C. There was recovered 89.8 grams of liquid boiling at about 77° C. and comprising 86.6 grams of ethanol and 3.2 grams of isopropanol derived from the tetraisopropyl titanate used. This corresponds to about 98% conversion of tetraethyl silicate to tetrabutyl silicate.

*Example II*

74.1 parts (0.5 mol) of dimethyl diethoxy silane, 74.1 parts (1 mol) of n-butanol and 4.6 parts of tetraisopropyl titanate were charged to the same fractionating still as used in Example I. On heating to reflux, there was removed rapidly by suitable fractional distillation 48 parts of ethanol (approximately theoretical amount) at the normal temperature of 77° C. The residue was identified as dimethyl dibutoxy silane. B. P. 186–188° C.

*Example III*

In a similar manner, 7.4 parts of dimethyl diethoxy silane, 11.6 parts of butyl acetate and 0.5 part of tetraisopropyl titanate were added to a suitable fractionating still. When distillation was begun, 8.1 parts of ethyl acetate was removed at 77° C. This constitutes about 92% of theory and the residue was identified as substantially pure dimethyl dibutoxy silane.

*Example IV*

178 parts of methyl triethoxy silane, 222 parts of n-butanol and 8 parts of tetrabutyl titanate are charged to a suitable fractionating still and heated to reflux temperature. After a brief reflux period, the head temperature is 77° C. indicating that the refluxing liquid is ethanol and by a suitable fractional distillation through the column approximately 135 parts of ethanol are removed (substantially the theoretical amount). The residue in the flask has a boiling point of about 115° C. at 10 mm. mercury pressure which indicates that it is substantially pure methyl tributoxy silane.

*Example V*

208 parts of tetraethyl silicate and 240 of n-propanol are added to the fractionating still together with 5 parts of tetraisopropyl titanate. On heating to reflux, 180 parts (substantially theoretical) of ethanol is removed at about 77° C. The material remaining in the flask is identified at tetra-n-propyl silicate with a boiling point of 225–227° C.

*Example VI*

148 parts of dimethyl diethoxy silane and 186 parts of phenol are added to the fractionating column together with 7.5 parts of tetraphenyl titanate. On heating to the distillation temperature, approximately 92 parts of ethanol is removed at about 77° C. leaving in the flask substantially pure dimethyl diphenoxy silane.

*Example VII*

148 parts of dimethyl diethoxy silane, 148 parts of secondary butanol and 5 parts of tetraisopropyl titanate are heated in a flask whereupon about 90 parts of ethanol is distilled over in a short time to leave in the flask a liquid with a boiling point of about 173.6° C. which identifies the liquid as dimethyl di-s-butoxy silane.

*Example VIII*

190 parts of vinyl triethoxy silane, 300 parts of cyclohexanol and 9 parts of tetrabutyl titanate are charged to the fractionating still and heated to reflux whereupon 138 parts of ethanol is rapidly removed at the normal temperature of 77° C. leaving in the flask a high boiling liquid which is identified as vinyl tricyclohexoxy silane.

The titanium esters preferred for use in this invention are characterized by the structural formula $Ti(OR)_4$ where R may be the same or different hydrocarbon radicals selected from the group consisting of alkyl, aryl, alkenyl, aralkyl, and alkaryl radicals. Examples of suitable catalysts with the aforementioned structure are tetraphenyl titanate, tetraisopropyl titanate, tetrabutyl titanate, tetraethyl titanate and tetrastearyl titanate and triethyl phenyl titanate. These titanium esters are effective as ester interchange catalysts in widely varying amounts. For the purposes of this invention there is no set limit on the quantity used, but it has been found that, for most uses, the optimum amount of titanium ester catalyst is between about 0.01% and 10% by weight of the silicon ester used. In several of the examples shown above, the amount used is in the middle of this range and such use brings about very satisfactory results. However, amounts on either side of the above range are effective. The particular ester to be used in any given situation may be largely controlled by the availability and other conditions which would be obvious to a skilled worker. For instance, when an alcohol is reacted with the silicon ester, it is frequently desirable to use the titanium ester which corresponds to the alcohol.

As previously mentioned, ester interchange reactions of the type within the scope of this invention are well known, as are the reactants. The silicon esters are discussed earlier in the specification. Examples of these esters which are especially suitable for purposes of this invention include tetraethyl silicate, tetramethyl silicate, dimethyl diethoxy silane, methyl triethoxy silane, tetraallyl silicate, triethylbutyl silicate, diethyl dibutyl silicate, tributyethyl silicate, tetrabutyl silicate, tetraphenyl silicate, tetrapropyl silicate.

The organic esters which take part in these ester interchange reactions can be either monocarboxylic acid esters or polycarboxylic acid esters. The only requirement of these carboxylic acid esters is that they contain an alcohol-derived portion which will exchange with the alcohol-derived portion of the silicon ester. The alcohol-derived portion of the carboxylic acid ester may be from such alcohols as butanol, cyclohexanol, amyl alcohol, glycol, glycerol and the like, and the acid-derived portion may be from such acids, as acetic acid.

The particular alcohols which may be used in this reaction are also not critical, and they may be either mono or polyhydroxy alcohols such as butanol, glycol and glycerol. Furthermore, phenols may be used in the same manner as alcohols. In the case of the reaction of the alcohol or phenol with the silicon ester, there is formed a new alcohol or phenol which is derived from an organic hydrocarbon radical of the silicon ester linked to the silicon atom through oxygen.

The ester interchange reactions of this invention are equilibrium reactions which may be pushed to completion by removal of one of the end products. This removal of end products may be accomplished by conventional means such as distillation, the use of selective solvents, or the selection of conditions which will precipitate one of the end products. In some instances, it may be desirable to leave the reaction mixture in equilibrium. For example, when the silicon ester is to be used in a coating composition or a polish, the product may be sold as an equilibrium mixture. When such a composition is applied to a surface, evaporation of the end product alcohol or organic ester would cause the reaction to shift towards completion.

It is possible by means of the reactions described herein to obtain almost any higher boiling silicon ester from the relatively simple esters of the lower boiling alcohols. This reaction itself is not new, but the use of the titanium compounds as catalysts causes the reaction to take place in a very short period of time and hence makes practical something which had been largely a laboratory curiosity heretofore. The compounds thus obtained have many uses. They are particularly valuable in the manufacture of the polymeric silicones by controlled hydrolysis reactions, and they are also useful for the preparation of mixed polymers with titanium compounds wherein the mixture of the silicon ester and a titanium ester is hydrolyzed under controlled conditions to give the polymeric compounds.

This application is a continuation-in-part of my copending application Serial No. 256,373, filed November 14, 1951.

I claim as my invention:

1. In a process for conducting an ester interchange reaction between a silicon ester and an organic compound selected from the group consisting of alcohols, phenols and esters of carboxylic acids, the improvement which comprises incorporating with the reactants a catalytic amount of a titanium ester having the structural formula $Ti(OR)_4$ where R is a hydrocarbon radical, and effecting the ester interchange reaction.

2. In a process for conducting an ester interchange reaction between a silicon ester and an ester of a carboxylic acid, the improvement which comprises incorporating with the reactants a catalytic amount of a titanium ester having the structural formula $Ti(OR)_4$ where R is a hydrocarbon radical, and effecting the ester interchange reaction.

3. In a process for conducting an ester interchange reaction between a silicon ester and an alcohol, the improvement which comprises incorporating with the reactants a catalytic amount of a titanium ester having the structural formula $Ti(OR)_4$ where R is a hydrocarbon radical, and effecting the ester interchange reaction.

4. In a process for conducting an ester interchange reaction between a silicon ester and an organic compound selected from the group consisting of alcohols, phenols and esters of carboxylic acids, the improvement which comprises incorporating with the reactants a catalytic amount of a titanium ester having the structural formula $Ti(OR)_4$ where R is an alkyl radical, and effecting the ester interchange reaction.

5. In a process for conducting an ester interchange reaction between a silicon ester and an ester of a carboxylic acid, the improvement which comprises incorporating with the reactants a catalytic amount of tetraisopropyl titanate, and effecting the ester interchange reaction.

6. In a process for conducting an ester interchange reaction between a silicon ester and an alcohol, the improvement which comprises incorporating with the reactants a catalytic amount of tetraisopropyl titanate, and effecting the ester interchange reaction.

7. In a process for conducting an ester interchange reaction between a silicon ester and an ester of a carboxylic acid, the improvement which comprises incorporating with the reactants a catalytic amount of tetrabutyl titanate, and effecting the ester interchange reaction.

8. In a process for conducting an ester interchange reaction between a silicon ester and an alcohol, the improvement which comprises incorporating with the reactants a catalytic amount of tetrabutyl titanate, and effecting the ester interchange reaction.

9. In a process for conducting an ester interchange reaction between a silicon ester and an organic compound selected from the group consisting of alcohols, phenols and esters of carboxylic acids, the improvement which comprises incorporating with the reactants a catalytic amount of an alkyl orthotitanate, heating to effect an ester interchange, and distilling off the more volatile end product.

References Cited in the file of this patent
UNITED STATES PATENTS

| | | |
|---|---|---|
| 2,276,094 | Rothrock | Mar. 10, 1942 |
| 2,630,446 | Gresham | Mar. 3, 1953 |

OTHER REFERENCES

Peppard et al.: "Jr. Am. Chem. Soc.," vol. 68 (1946), pp. 77–79.